United States Patent
Kojima et al.

(10) Patent No.: US 10,234,627 B1
(45) Date of Patent: Mar. 19, 2019

(54) COMPACT PHOTONIC DEVICES

(71) Applicant: Mitsubishi Electric Research Laboratories, Inc., Cambridge, MA (US)

(72) Inventors: Keisuke Kojima, Weston, MA (US); Min Teng, Lafayette, IN (US); Toshiaki Koike Akino, Belmont, MA (US); Bingnan Wang, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/916,563

(22) Filed: Mar. 9, 2018

(51) Int. Cl.
G02B 6/12 (2006.01)
*G02B 6/122* (2006.01)
*G02B 6/14* (2006.01)
*B82Y 20/00* (2011.01)
G02B 6/293 (2006.01)

(52) U.S. Cl.
CPC .......... *G02B 6/12007* (2013.01); *B82Y 20/00* (2013.01); *G02B 6/1225* (2013.01); *G02B 6/14* (2013.01); *G02B 6/2938* (2013.01); *G02B 2006/12152* (2013.01)

(58) Field of Classification Search
CPC ............... G02B 6/1225; G02B 6/14; G02B 2006/12152; B82Y 20/00
See application file for complete search history.

(56) References Cited

U.S. PATENT DOCUMENTS

| | | | | |
|---|---|---|---|---|
| 7,242,837 | B2 * | 7/2007 | Talneau | B82Y 20/00 385/129 |
| 7,783,139 | B2 | 8/2010 | Noda et al. | |
| 8,571,373 | B2 * | 10/2013 | Wang | G02B 6/1225 385/129 |
| 8,942,517 | B2 * | 1/2015 | Kojima | B82Y 20/00 385/3 |
| 9,784,925 | B2 | 10/2017 | Bushnell et al. | |

(Continued)

FOREIGN PATENT DOCUMENTS

GB 2384319 A * 7/2003 ............ B82Y 20/00

OTHER PUBLICATIONS

Frandsen, Lars H. et al., "Topology optimized mode conversion in a photonic crystal waveguide fabricated in silicon-on-insulator material," Opt. Express vol. 22, No. 7, pp. 8525-8532 (2014).*

(Continued)

*Primary Examiner* — Daniel Petkovsek
(74) *Attorney, Agent, or Firm* — Gene Vinokur; James McAleenan; Hironori Tsukamoto (57) ABSTRACT

A photonic device for converting optical modes of optical beams includes a first port to receive a first beam having a first mode, a mode converter and a second port to transmit the first beam. The mode converter is configured to broaden the first beam to convert the first mode into a second mode and narrow the broadened first beam at an output side of the mode converter, wherein the mode converter includes a guide material having a first refractive index and perturbation segments each having a second refractive index, wherein the first refractive index is greater than the second refractive index, wherein the perturbation segments are arranged in the guide material to cross the first beam.

15 Claims, 6 Drawing Sheets

(56) References Cited

U.S. PATENT DOCUMENTS

| | | | |
|---|---|---|---|
| 2002/0054738 A1 | 5/2002 | Matsushima et al. | |
| 2011/0028346 A1* | 2/2011 | Chakravarty | G01N 21/253 506/12 |
| 2017/0254959 A1 | 9/2017 | Miao et al. | |

OTHER PUBLICATIONS

D. Chen, X. Xiao, L. Wang, Y. Yu, W. Liu and Q. Yang, "Low-loss and fabrication tolerant silicon mode order converters based on novel compact tapers,", Opt. Express, 23, 9, 11152-11159 (2015).

L. H. Frandsen, Y. Elesin, L. F. Frellsen, M. Mitrovic, Y. Ding, O. Sigmund and K. Yvind, "Topology optimized mode conversion in a photonic crystal waveguide fabricated in siliconon-insulator material,", Opt. Express, 22, 7, 8525-8532 (2014).

L. Lu, M. Zhang, F. Zhou and D. Liu, "An Ultra-Compact Colorless 50:50 Coupler Based on PhClike Metamaterial Structure", OFC, Los Angeles (2016).

vK. Kojima, B. Wang, U. Kamilov, T. K. Akino and K. Parsons, "Acceleration of FDTD-based Inverse Design Using a Neural Network Approach", IPR, New Orleans (2017).

Y. Ma, Y. Zhang, S. Yang, A. Novack, R. Ding, A. Lim, G. Lo, T. Jones and M. Hochberg, "Ultralow loss single layer submicron silicon waveguide crossing for SOI optical interconnect," Opt. Express, 21, 24, 29374-29382, (2013).

\* cited by examiner

FIG. 6C

COMPACT PHOTONIC DEVICES

FIELD OF THE INVENTION

This invention generally relates to compact photonic devices, and more particularly to broad band mode converters.

BACKGROUND OF THE INVENTION

On-chip mode division multiplexing (MDM) has been heavily researched over decades, which transmits multiple channels in one shared multimode bus waveguide to enhance transmission capacity. A number of MDM devices have been developed, including multiplexers/demultiplexers (MUX/DEMUX), mode order filters and mode order converters. The mode order converters are used to convert high order modes to transverse electric fundamental mode ($TE_0$) first before processing, and the high order mode converting process is one major challenge of on-chip MDM. Accordingly, it is desired to realize high order mode converters in compact sizes.

SUMMARY OF THE INVENTION

Some embodiments of the present disclosure are based on recognition that compact photonic devices based on a family of ultra-compact (~4 μm length) SOI mode order converters can be obtained according to the design optimization by use of a machine-learning-assisted optimization method. $TE_0$, $TE_1$ and $TE_2$ mode beams can be mutually converted with ~85% efficiency over 100 nm bandwidth. In principle, the optimization technique can be used to design arbitrary mode order converters. In addition, topology optimized mode order converter can help establishing alternative functionalities (such as crossing and bending) for high order modes with a compact footprint.

In according to some embodiments of the present disclosure, a photonic device is provided for converting optical modes of optical beams. The photonic device includes a first port to receive a first beam having a first mode; a mode converter configured to broaden the first beam to convert the first mode into a second mode at a middle part of the mode converter and narrow the broadened first beam at an output side of the mode converter, wherein the mode converter includes a guide material having a first refractive index and perturbation segments each having a second refractive index, wherein the first refractive index is greater than the second refractive index, wherein the perturbation segments are arranged in the guide material to cross the first beam; and a second port to transmit the first beam having the second mode, wherein a width of the mode converter is greater than widths of the first and second ports, wherein the width of the second port is greater than the width of the first port, wherein the first and second ports and the mode converter have an identical thickness.

Further, an embodiment of the present disclosure provides a photonic device for converting optical modes of optical beams. The photonic device includes first input and output converters and second input and output converters. Each of the converters comprises a first port to receive a beam having a first mode; a mode converter configured to broaden the beam to convert the first mode into a second mode at a middle part of the mode converter and narrow the broadened beam at an output side of the mode converter, wherein the mode converter includes a guide material having a first refractive index and perturbation segments each having a second refractive index, wherein the first refractive index is greater than the second index, wherein the perturbation segments are arranged in the guide material to cross the first beam; and a second port to transmit the beam having the second mode, wherein a width of the mode converter is greater than widths of the first and second ports, wherein the width of the second port is greater than the width of the first port, wherein the first and second ports and the mode converter have an identical thickness. Further, the photonic device includes a cross guide that comprises a first cross guide having a first cross input port and a first cross output port; and a second cross guide having a second cross input port and a second cross output port, wherein the first cross guide crosses the second cross guide by a right angle, wherein each port of the first and second cross guides has a cross port width, wherein the first input cross port is connected to the second port of the first input converter and the first output cross port is connected to the first port of the first output converter, wherein the second input cross port is connected to the second port of the second input converter and the second output cross port is connected to the first port of the second output converter.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview of Embodiments of the Present Disclosure

On-chip mode division multiplexing (MDM) enables transmission of multiple optical channels in one shared multimode bus waveguide to enhance transmission capacity. Here the term mode means an optical spatial mode.

A number of MDM devices have been developed, including multiplexers/demultiplexers (MUX/DEMUX), mode order filters and mode order converters. One major challenge of on-chip MDM is the high order mode processing, such as bending and crossing. As a consequence, mode order converters are usually developed to convert high order modes ($TE_1$, $TE_2$, . . . ) to fundamental mode ($TE_0$) first before processing.

Silicon-on-insular (SOI) mode order converters have been proposed. The most intuitive converter is to evenly split a high order mode into multiple $TE_0$ pieces, then merged with proper phase relationship.

Figure 1A:
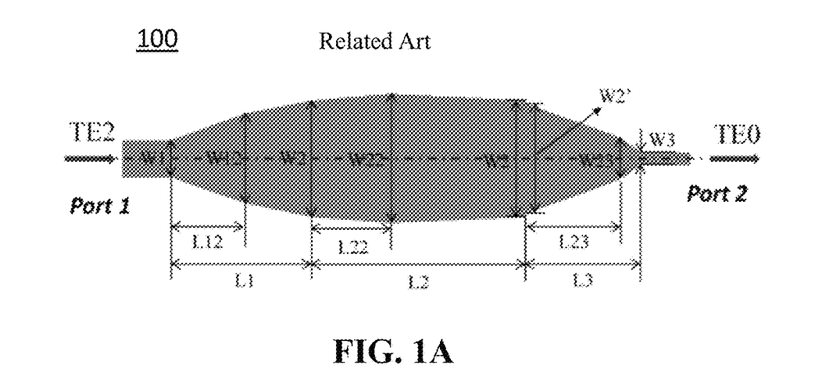
FIG. 1A shows a mode order converter of a related art.
Figure 1B:
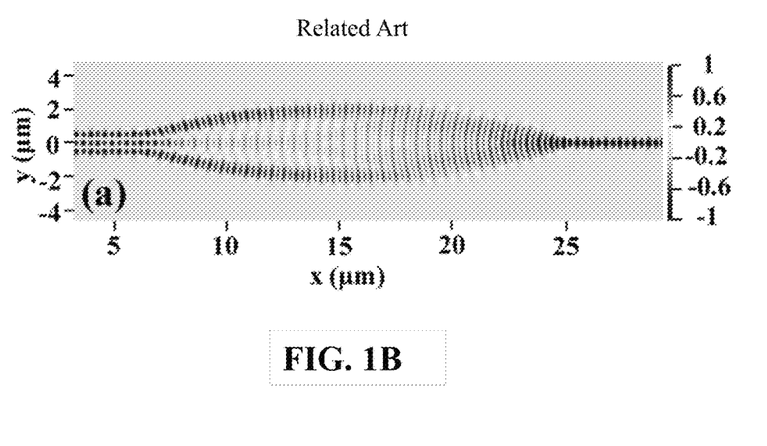
FIG. 1B shows a major electric field component (Ey) distribution plot of the mode converter in FIG. 1A.

FIG. 1A shows a mode order converter 100 of a related art. FIG. 1B shows a major electric field component (Ey) distribution plot of the mode converter in FIG. 1A. It is shown that the mode order converter with ultra-low loss based on adiabatic taper on a 30 μm-long footprint shown in FIG. 1A can convert $TE_2$ mode into $TE_0$ mode as shown in FIG. 1B.

Further, a $TE_0$-to-$TE_1$ converter with more compact footprint (~6 μm length) can be realized using inverse design. Such a device can be optimized inside a photonic crystal waveguide, giving 70% $TE_0$-to-$TE_1$ conversion efficiency over 40 nm bandwidth. The size of a mode order converter is an important factor, which determines how much functionality be packed in a limited size. Although photonic crystals enable compact device size, the operational bandwidth becomes relatively narrow, because the photonic crystals use a specific resonance conditions. Further, the mode order converter can be referred to as a mode converter.

Figure 2A:
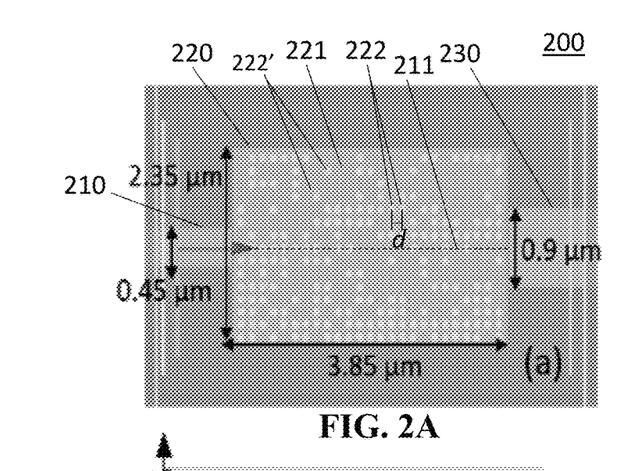
FIG. 2A shows a $TE_0$-to-$TE_1$ mode order converter, according to embodiments of the present disclosure.

FIG. 2A shows a $TE_0$-to-$TE_1$ mode converter 200, according to embodiments of the present disclosure. The $TE_0$-to-$TE_1$ mode converter 200 includes a first port 210, a mode converter 220 and a second port 230. FIG. 2A is an example illustrating an optimized geometry for a $TE_0$ to $TE_1$ mode converter.

The first port 210 receives a first beam (input beam, indicated by an arrow in the figure) having a first mode. The mode converter 220 is configured to broaden the first beam and convert the first mode into two at a middle part of the mode converter 220. Further, the mode converter 220 delays the phase of one of the parts relative to the other, and narrows the broadened first beam at an output side of the mode converter 200, thus creating a $TE_0$ mode. All of the above-mentioned functionalities in the mode converter 220 are done in a distributed manner. The mode converter 220 includes a guide material 221 having a first refractive index and perturbation segments 222. In this case, each of the perturbation segments 222 has a second refractive index and a minimum pitch between the perturbation segments 222 is indicated by a pitch d in the figure.

The first refractive index is greater than the second refractive index and the perturbation segments 222 are arranged in the guide material 221 to cross the first beam. Further, the second port 230 is configured to transmit the first beam having the second mode. In this case, a width of the mode converter 220 is arranged to be greater than widths of the first and second ports 210 and 230. The width of the first port 210 is chosen to support only the $TE_0$ mode. The width of the second port 230 is arranged to be greater than the width of the first port 210 in order to support $TE_1$ mode, and the first and second ports 210 and 230 and the mode converter 220 are configure to have an identical thickness.

Further, when the first and second modes are respectively an m-th and an n-th mode represented by $TE_m$ and $TE_n$ and when at least one of in and n is an odd number, the perturbation segments 222 are arranged to be asymmetrically along a beam direction centerline 211 drawn from the first port 210 to the second port 230.

According to some embodiments, the $TE_0$-to-$TE_1$ converter 200 can be optimized on a 3.85 μm×2.35 μm silicon region, which is discretized into 15×25 perturbation segments 222 (rectangular lattice) binary problem. Each perturbation segment 222 represents a fully etched hole with 50 nm radius at 150 nm lattice constant (or pitch) d, where "1"

means a hole etched and "0" means no hole. A 150 nm pitch d satisfies the above mentioned criteria (<270 nm). The $TE_0$-to-$TE_1$ mode converter 200 can be covered by $SiO_2$ top cladding. Cylindrical holes corresponding to the perturbation segments 222 are also filled with SiO2. If an input mode source launches a $TE_0$ or $TE_1$ mode over 100 nm bandwidth centered at 1.55 μm while transmission and reflection into $TE_0$, $TE_1$, or $TE_2$ modes are separately calculated.

It should be noted that some perturbation segments can be arranged apart more than the pitch d from a group of the perturbation segments 222, which are indicated as segments 222' in the figure.

The local refractive index profile can be numerically optimized. One of the method is to use direct binary search (DBS), and another method is to use machine learning. In both methods, the local refractive index change, or a fixed-size hole, is described as binary problem. Alternatively, the changes can be described more in smaller granularity, i.e., continuous values of hole sizes, or continuous change in the shape.

Figure 2B:
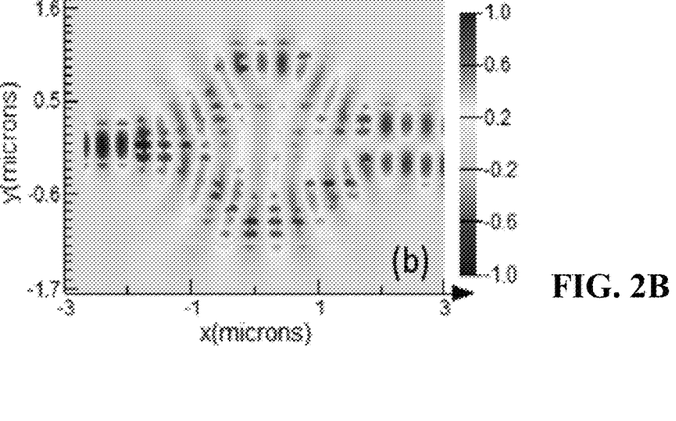
FIG. 2B shows a major E field component ($E_y$) distribution plot of the $TE_0$-to-$TE_1$ mode order converter of FIG. 2A.

FIG. 2B shows a major E field (electric field) component (Ey) distribution plot of the $TE_0$-to-$TE_1$ mode converter 200. From the field distribution, it is seen that the input beam is split and then merged at the output port (second port 230) with the top beam delayed by π phase shift relative to bottom beam. Distributed holes, which can be referred to as the perturbation segments 222, increase the phase velocity of the beam compared with Si region (guide material 221) without holes (perturbation segments 222) since the average refractive index of the perturbation segments 222 is smaller than that of the guide material 221 (Si region).

Figure 2C:
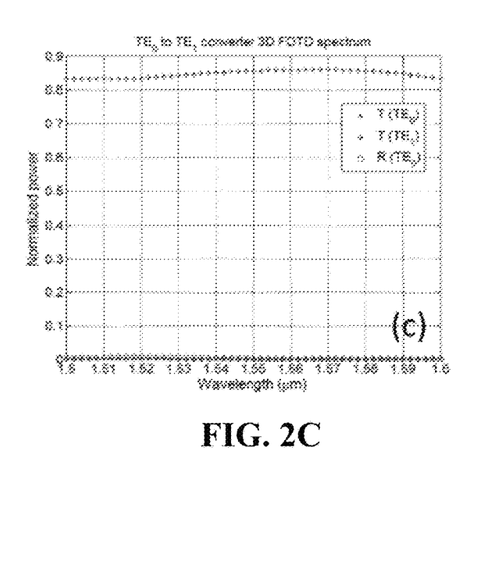
FIG. 2C is an FDTD spectrum indicating the efficiency of the device.

FIG. 2C is the transmission and reflection of each mode of the converter 200 as a function of frequency, showing ~85% transmission efficiency with ~0.5% crosstalk and reflection obtained over 100 nm bandwidth. Compared with a related art $TE_0$-to-$TE_1$ converter based on photonic crystals, FIG. 2C indicates that the converter 200 works over a substantially broader bandwidth since the converter 200 avoids the Bragg reflection zone. The efficiency of the converter 200 can potentially be improved by using a larger matrix, although larger footprint and higher computational effort will be required.

Further, some embodiments of the present disclosure are based on recognition that subwavelength devices can provide compact photonic devices without relying on the specific resonance condition. The optical field feels the local averages of small structures. The small structures can be referred to as perturbation segments or pixels. The condition for the subwavelength devices is expressed as $$d < \lambda/(2n_{eff}) \tag{1}$$

where d is the minimum pitch or distance between the perturbation segments, $n_{eff}$ is a highest effective index of a waveguide mode of the guide material, and λ is a wavelength of the input signal. When a typical SOI (silicon on insulator) structure is used, $n_{eff}$ is around 2.85 around a wavelength of 1550 nm. So d should be determined to be less than 270 nm.

Further, a $TE_0$-to-$TE_2$ converter can be designed with a similar procedure describe above. In this case, the two outer lobes of $TE_2$ should be delayed equally and merged with the center lobe.

Figure 3A:
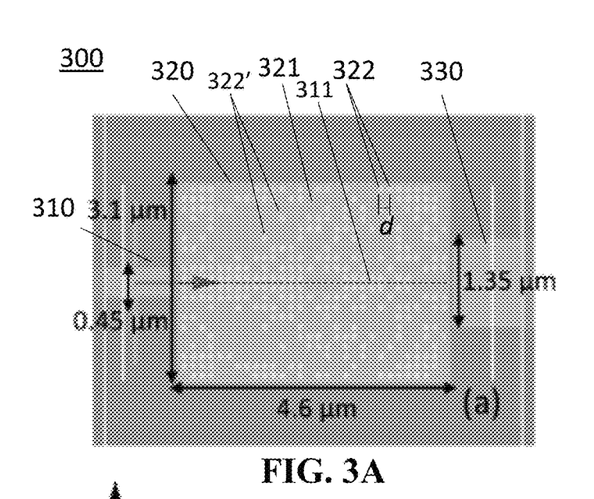
FIG. 3A shows an example of a $TE_0$-to-$TE_2$ converter, according to embodiments of the present disclosure.

FIG. 3A shows an example of a $TE_0$-to-$TE_2$ mode converter 300 according to embodiments of the present disclosure. An example of a finalized geometry of the $TE_0$-to-$TE_2$ converter 300 after optimization is illustrated in the figure.

The $TE_0$-to-$TE_2$ mode converter 300 includes a first port 310, a mode converter 320 and a second port 330. The structure of the $TE_0$-to-$TE_2$ mode converter 300 is similar to that of the $TE_0$-to-$TE_1$ mode converter 200.

The mode converter 320 includes a guide material 321 having a first refractive index and perturbation segments 322. Each of the perturbation segments 322 has a second refractive index and a minimum pitch between the perturbation segments 222 is arranged to have a pitch d as indicated in the figure. It should be noted that some perturbation segments can be arranged apart more than the pitch d from a group of the perturbation segments 322, which are indicated as segments 322' in the figure.

Further, when the first and second modes are respectively an m-th and an n-th mode represented by $TE_m$ and $TE_n$ and when in and n are even numbers, the perturbation segments 321 are arranged to be approximately symmetrically along a beam direction centerline 311 drawn from the first port 310 to the second port 330.

For designing the $TE_0$-to-$TE_2$ mode converter 300, a horizontally symmetric structure (20×30) is being evaluated on a 4.6 μm×3.1 μm rectangular silicon region. During inverse design, a 10×30 matrix (top half of the geometry) is optimized and mirrored to the bottom half of the Si region, since both the $TE_0$ and the $TE_2$ modes are symmetric.

Figure 3B:
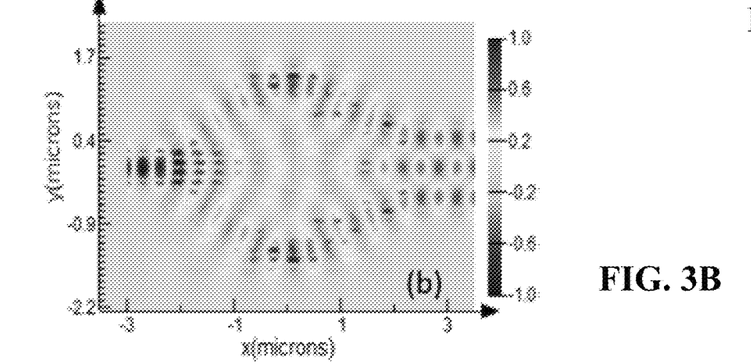
FIG. 3B shows a major E field component ($E_y$) distribution plot of the $TE_0$-to-$TE_2$ mode order converter of FIG. 3A.

FIG. 3B shows a major E field component (Ey) distribution plot of the $TE_0$-to-$TE_2$ mode converter 300, illustrating that the most majority of input $TE_0$ splits equally into two outer routes and some fraction of $TE_0$ is diffracted and refocused at the output waveguide along the middle route.

Figure 3C:
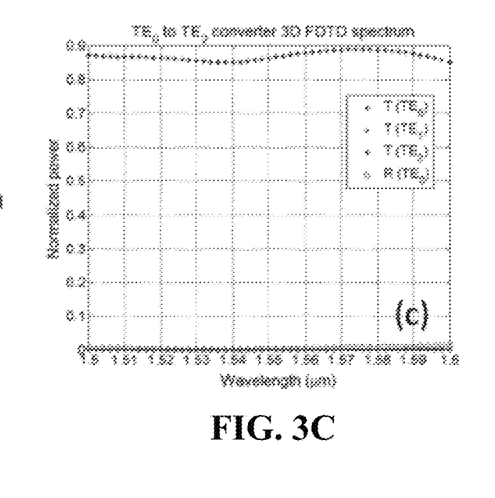
FIG. 3C is an FDTD spectrum indicating the efficiency of the device of FIG. 3A.

FIG. 3C shows the transmission and reflection of finalized device indicating over 85% transmission efficiency with less than 1% crosstalk and reflection. $TE_1$ crosstalk power is almost negligible here because $TE_0$ input cannot excite $TE_1$ along a horizontally symmetric structure.

Figure 4A:
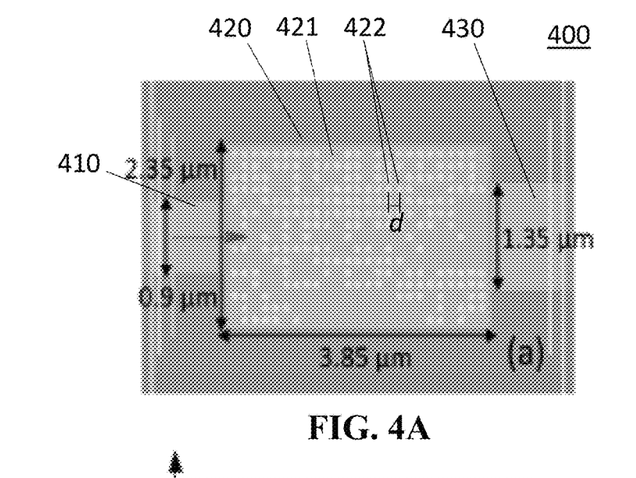
FIG. 4A shows a geometry of a $TE_1$-to-$TE_2$ converter, according to embodiments of the present disclosure.

FIG. 4A shows a $TE_1$-to-$TE_2$ mode converter 400, according to embodiments of the present disclosure. The $TE_1$-to-$TE_2$ mode converter 400 can be realized in a similar matter as shown in FIGS. 2A and 3A. As discussed above, in some cases, some perturbation segments can be arranged apart more than the pitch d from a group of the perturbation segments according to designing optimization of the mode convertor.

Figure 4B:
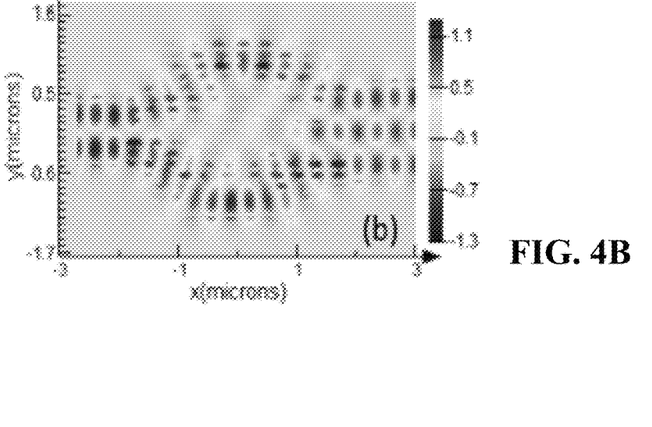
FIG. 4B shows a major E field component ($E_y$) distribution plot of the $TE_1$-to-$TE_2$ converter.
Figure 4C:
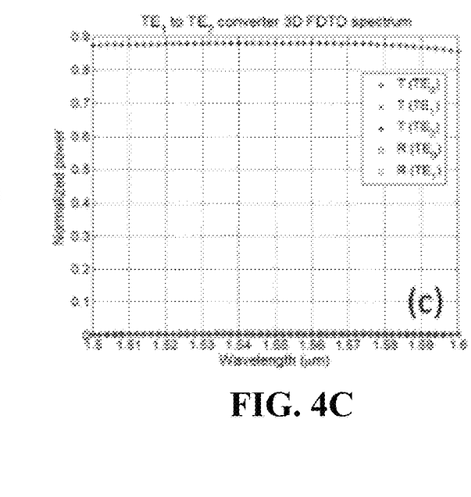
FIG. 4C shows an FDTD spectrum of the $TE_1$-to-$TE_2$ converter.

The field plot FIG. 4B indicates that direct conversion between $TE_1$ and $TE_2$ does not demand conversion via $TE_0$ as a stepping stone. FIG. 4C shows that the optimized device can obtain roughly 87% transmission efficiency with crosstalk/reflection into $TE_0$ and $TE_1$ both below 1%. Unlike using a 60 μm-long cascaded TE0 to high order mode converter based on an adiabatic taper [1], this direct $TE_1$-to-$TE_2$ converter can achieve 87% efficiency with device length less than 4 μm.

Figure 5A:
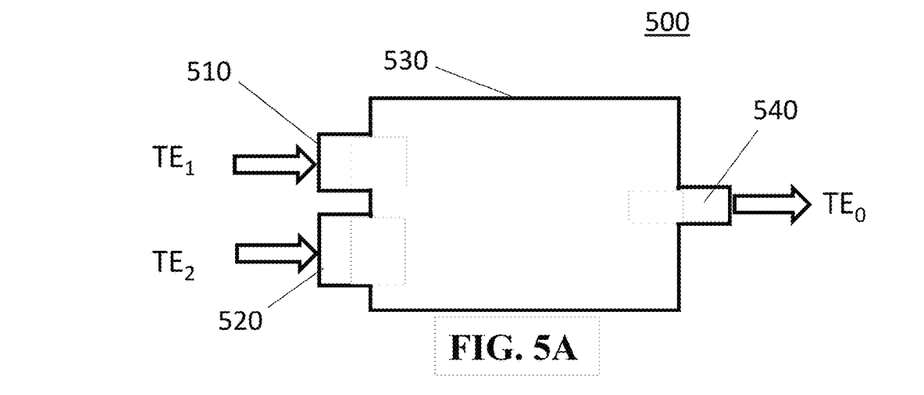
FIG. 5A shows a schematic illustrating a $TE_1|TE_2$-to-$TE_0$ converter, according to embodiments of the present disclosure.

FIG. 5A shows a schematic illustrating a $TE_1|TE_2$-to-$TE_0$ hybrid mode converter-combiner 500, according to embodiments of the present disclosure. The $TE_1|TE_2$-to-$TE_0$ converter-combiner 500 includes a first optical mode input 510, a second optical mode input 520, a mode converter 530 and an output 540. In some cases, the output 540 can have another optical mode order, such ad $TE_1$ or $TE_2$. The optimization algorithm can realize these functionalities. Since the mode orders of the input signals are different, the width of the inputs 510 and 520 are different.

Figure 5B:
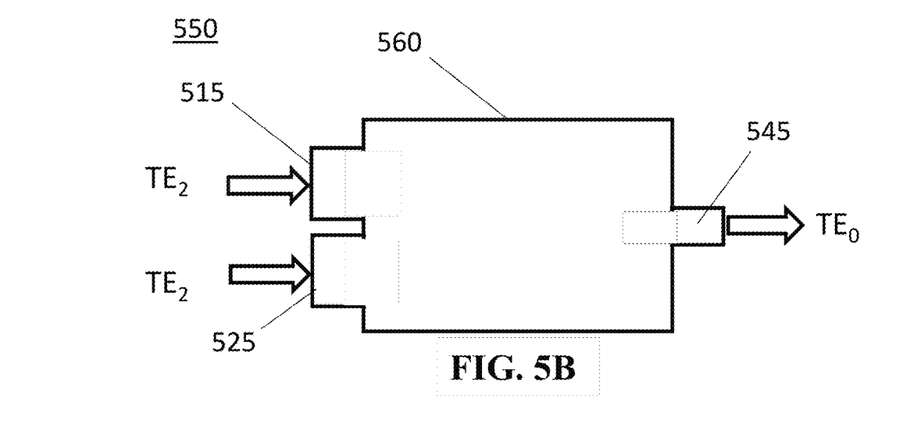
FIG. 5B shows a schematic illustrating a $TE_2|TE_2$-to-$TE_0$ converter, according to embodiments of the present disclosure.

FIG. 5B shows a schematic illustrating a $TE_2|TE_2$-to-$TE_0$ hybrid mode converter-combiner 500, according to embodiments of the present disclosure. The $TE_2|TE_2$-to-$TE_0$ converter 550 includes a first optical mode input 515, a second optical mode input 525, a mode converter 560 and an output

545. Because the mode order is the same, the widths of the input 515 and 550 are usually the same. In some cases, the output 545 can have another optical mode order, such as $TE_1$ or $TE_2$.

Both in FIGS. 5A and 5B, the hybrid mode converter-combiner can first convert the higher-order input modes into $TE_0$ modes, and then combine the multiple $TE_0$ modes into a single $TE_0$ mode. Alternatively, the higher order modes can be combined first if they are of the same order, and then converted to a $TE_0$ mode.

Combining multiple functionalities into a single device have two major advantages. By eliminating the waveguide connecting two distinct devices, there will be space savings. Furthermore, there can be lower optical insertion loss, since the joint between the waveguide and the optical device is a major source of optical loss.

As described above, holes, which correspond to the perturbation segments 222, 322 and 422 indicated in FIGS. 2A, 3A and 4A, are arranged in a periodic (lattice) manner, however, there is no need to be arranged in that way.

Figure 6A:
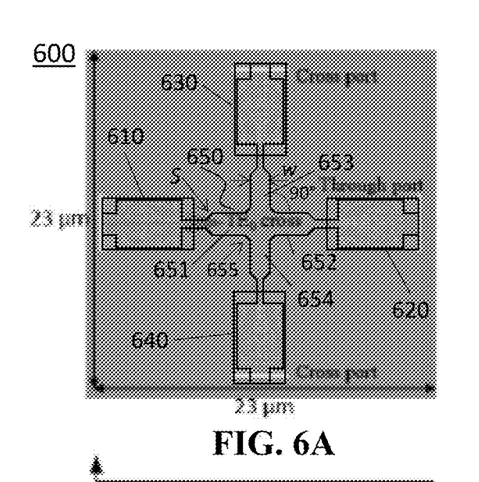
FIG. 6A shows an example of a $TE_2$ 90-degree cross converter, according to embodiments of the present disclosure.

Further, the ultra-compact mode order converters can also be cascaded with other devices to process high order modes. FIG. 6A shows an example of a $TE_2$ mode 90-degree cross 600, which cascades four $TE_0$-to-$TE_2$ converters to a conventional TE0 90-degree cross at four ports.

The $TE_2$ mode 90-degree cross 600 includes first input and first output converters 610 and 620 and second input and second output converters 630 and 640. Each of the converters 610, 620, 630 and 640 includes a first port to receive a beam having a first mode, a mode converter configured to broaden the beam to convert the first mode into a second mode at a middle part of the mode converter and narrow the broadened beam at an output side of the mode converter.

Further, the mode converter includes a guide material having a first refractive index and perturbation segments. Each perturbation segment has a second refractive index, and the first refractive index is greater than the second index. In this case, the perturbation segments are arranged in the guide material to cross the first beam.

Each of the converters 610, 620, 630 and 640 includes further includes a second port to transmit the beam having the second mode, wherein a width of each of the mode converters 610, 620, 630 and 640 is greater than widths of the first and second ports. In this case, the width of the second port is greater than the width of the first port, and further, the first and second ports and the mode converter have an identical thickness.

The $TE_2$ mode 90-degree cross 600 includes a cross guide 650. The cross guide 650 includes a first cross guide having a first cross input port 651 and a first cross output port 652, and a second cross guide having a second cross input port 653 and a second cross output port 654. The first and second output ports 652 and 654 can be referred to as the first and second through ports 652 and 654.

The first cross guide crosses the second cross guide by a right angle. The crossing portion of the first cross guide crosses the second cross guide includes chamfer corners 655. One of the chamfer corners 655 is indicated by an arrow 655 in FIG. 6A. Each port of the first and second cross guides has a cross port width w. Via transient slopes S of the first and second cross guides, the first input cross port 651 is connected to the second port of the first input converter 610 and the first output cross port 652 is connected to the first port of the first output converter 620. The second input cross port 653 is connected to the second port of the second input converter 630, and the second output cross port 654 is connected to the first port of the second output converter 640.

Figure 6B:
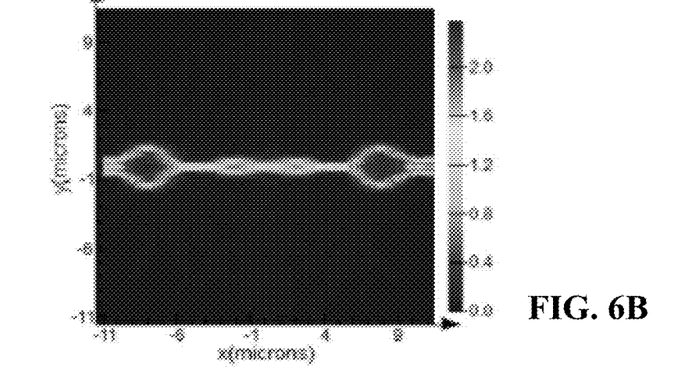
FIG. 6B shows a major E field component ($E_y$) distribution plot of the $TE_2$ mode 90-degree cross converter.

In FIG. 6A, an example illustration indicates that the total footprint of the $TE_2$ 90-degree cross is 23 μm×23 μm. FIG. 6B shows a major E field component ($E_y$) distribution plot of the $TE_2$ mode 90-degree cross 600. In this case, the first input converter 610 receives and converts a first $TE_2$ mode optical signal into a first $TE_0$ mode optical signal. The first $TE_0$ mode optical signal propagates the cross guide 650 via the first cross input port 651 and the first cross output port 652. Further, the first $TE_0$ mode optical signal is received by the first output converter 620 and converted into the first $TE_2$ mode optical signal at the output port of the first output converter 620. This shows that $TE_2$-$TE_0$-$TE_2$ mode conversions properly take place through the input converter 610 and the first output converter 620. The first $TE_0$ mode optical signal can propagate the cross guide 650 with lower insertion loss.

Similarly, when a second $TE_2$ mode optical signal is received and converted into a second $TE_0$ mode optical signal by the second input converter 630, the second $TE_0$ mode optical signal is received by the second output converter 640 via the second cross input port 653 and the second cross output port 654 of the cross guide 650. When receiving the second $TE_0$ mode optical signal from the cross guide 650, the second output converter 640 converts the second $TE_0$ mode optical signal into the second $TE_2$ mode optical signal at the output port of the second output converter 640. In this case, the second $TE_0$ mode optical signal can propagate the cross guide 650 with lower insertion loss. By converting the first and second $TE_2$ mode optical signals into the first and second $TE_0$ mode optical signals, the converted first and second $TE_0$ mode optical signals can propagate the cross guide 650 with lower losses while crossing at the cross guide 650. Accordingly, the $TE_2$ mode 90-degree cross 600 can provide low signal losses of the first and second $TE_2$ mode optical signals while crossing the $TE_2$ 90-degree cross guide, as the first and second $TE_0$ mode optical signals converted from the first and second $TE_2$ mode optical signals can propagate the cross guide 650 with lower losses.

Figure 6C:
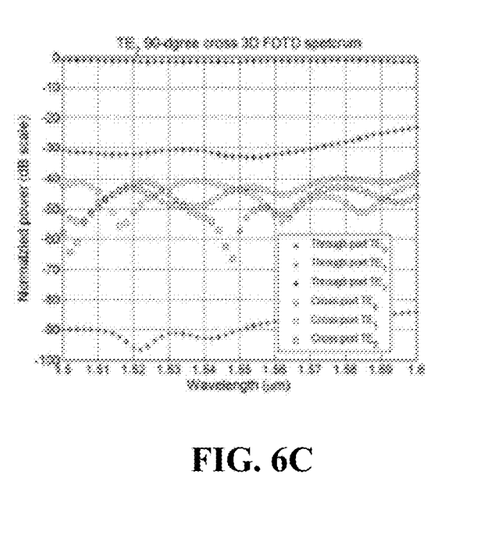
FIG. 6C shows an FDTD spectrum of the $TE_2$ mode 90-degree cross converter.

FIG. 6C shows simulated results that indicate that less than 1.5 dB insertion loss over 100 nm bandwidth is obtained. Only −30 dB $TE_0$ crosstalk is excited at through port over 80 nm bandwidth and all modes excited at cross port are well below −40 dB as shown in the figure.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

The input and output ports and the mode converter can be implemented in various material systems. The above examples used SOI. Alternatively, silicon nitride deposited on silicon dioxide may be used. Further, an indium gallium arsenide phosphide (InGaAsP) material layer grown on an indium phosphide (InP) substrate may also be used.

The above-mentioned embodiments of the present invention described only TE modes. However, devices can also be designed for transverse magnetic (TM) modes.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. For example, because of the principle of reciprocity, if the first port has $TE_0$ mode input and the second port has $TE_2$ output, then the device acts equally well for converting the $TE_2$ input from the second port to the $TE_0$ output from the first port.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A photonic device for converting optical modes of optical beams, comprising:
   a first port to receive a first beam having a first mode;
   a mode converter configured to broaden the first beam to convert the first mode into a second mode and narrow the broadened first beam at an output side of the mode converter, wherein the mode converter includes a guide material having a first refractive index and perturbation segments each having a second refractive index, wherein the first refractive index is greater than the second refractive index, wherein the perturbation segments are arranged in the guide material to cross the first beam, wherein a minimum pitch d between the perturbation segments is determined to satisfy a following condition, $d<\lambda/(2n_{eff})$ wherein $n_{eff}$ is a highest effective index of a waveguide mode of the guide material, wherein $\lambda$ is a wavelength of the first beam; and
   a second port to transmit the first beam having the second mode, wherein a width of the mode converter is greater than widths of the first and second ports, wherein the width of the second port is not identical to the width of the first port, wherein the first and second ports and the mode converter have an identical thickness.

2. The photonic device of claim 1, further comprises a top layer and a bottom layer, wherein the top and bottom layers having a third refractive index sandwich the first and second ports and the mode converter, wherein the first refractive index is greater than the third refractive index.

3. The photonic device of claim 2, wherein the first and second ports and the mode converter are silicon material, and the top and bottom layers are silicon dioxide material.

4. The photonic device of claim 1, wherein each of the perturbation segments is represented by a hole of the guide material.

5. The photonic device of claim 1, wherein a minimum pitch d between the perturbation segments is determined to satisfy a following condition, $d<\lambda/(2neff)$ and the perturbation segments are non-periodically arranged.

6. The photonic device of claim 1, wherein the first refractive index is identical to refractive indices of the first and second ports.

7. The photonic device of claim 1, wherein when the first and the second modes are respectively an m-th and an n-th mode represented by TEm and TEn, m and n are even numbers, wherein the perturbation segments are arranged to be approximately symmetrical along a beam direction centerline drawn from the first port to the second port.

8. The photonic device of claim 1, wherein when the first and second modes are respectively an m-th and an n-th mode represented by TEm and TEn, at least one of m and n is an odd number, wherein the perturbation segments are arranged asymmetrically along a beam direction centerline drawn from the first port to the second port.

9. The photonic device of claim 1, wherein the first and second ports and the mode converter are made from an identical material.

10. The photonic device of claim 9, wherein the identical material is silicon.

11. The photonic device of claim 9, wherein the identical material is silicon nitride.

12. The photonic device of claim 9, wherein the identical material is InGaAsP.

13. The photonic device of claim 1, further comprises one or more additional ports arranged on a side of the first or the second port, and width of the one or more additional ports are the same as or different from the first or the second port.

14. The photonic device of claim 1, wherein the identical thickness is from approximately 0.2 μm to approximately 0.5 μm.

15. A photonic device for converting optical modes of optical beams, comprising:
   first input and output converters and second input and output converters, wherein each of the converters comprises:
   a first port to receive a beam having a first mode;
   a mode converter configured to broaden the beam to convert the first mode into a second mode and narrow the broadened beam at an output side of the mode converter, wherein the mode converter includes a guide material having a first refractive index and perturbation segments each having a second refractive index, wherein the first refractive index is greater than the second index, wherein the perturbation segments are arranged in the guide material to cross the first beam, wherein a minimum pitch d between the perturbation segments is determined to satisfy a following condition, $d<\lambda/(2n_{eff})$ wherein $n_{eff}$ is a highest effective index of a waveguide mode of the guide material, wherein $\lambda$ is a wavelength of the first beam; and
   a second port to transmit the beam having the second mode, wherein a width of the mode converter is greater than widths of the first and second ports, wherein the width of the second port is greater than the width of the first port, wherein the first and second ports and the mode converter have an identical thickness; and
a cross guide comprising;
   a first cross guide having a first cross input port and a first cross output port; and
   a second cross guide having a second cross input port and a second cross output port, wherein the first cross guide crosses the second cross guide by a right angle, wherein each port of the first and second cross guides has a cross port width, wherein the first input cross port is connected to the second port of the first input converter and the first output cross port is connected to the first port of the first output converter, wherein the second input cross port is connected to the second port of the second input converter and the second output cross port is connected to the first port of the second output converter.

\* \* \* \* \*